United States Patent
Spiegl et al.

(10) Patent No.: US 9,702,353 B2
(45) Date of Patent: Jul. 11, 2017

(54) VALVE PLATE FOR GAS EXCHANGE VALVES

(71) Applicant: Hoerbiger Kompressortechnik Holding GmbH, Vienna (AT)

(72) Inventors: Bernhard Spiegl, Vienna (AT); Markus Testori, Hollabrunn (AT); Uwe Fuxa, Vienna (AT)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 160 days.

(21) Appl. No.: 14/475,821

(22) Filed: Sep. 3, 2014

(65) Prior Publication Data

US 2015/0075650 A1 Mar. 19, 2015

(30) Foreign Application Priority Data

Sep. 4, 2013 (AT) .............. A50547/2013

(51) Int. Cl.
*F04B 39/10* (2006.01)
*F16K 15/10* (2006.01)

(52) U.S. Cl.
CPC ...... *F04B 39/1053* (2013.01); *F04B 39/1033* (2013.01); *F16K 15/10* (2013.01); *Y10T 137/7861* (2015.04)

(58) Field of Classification Search
CPC .. F04B 39/1053; F04B 39/1033; F16K 15/10; Y10T 137/7861; Y10T 137/786; Y10T 137/7862; Y10T 137/7863; Y10T 137/7864; Y10T 137/7865
See application file for complete search history.

(56) References Cited

U.S. PATENT DOCUMENTS

| 2,501,744 | A | * | 3/1950 | Seligmann | ............ F16K 15/10 137/516.13 |
| 3,507,486 | A | * | 4/1970 | Schwaller | ............ F04B 39/1053 267/151 |
| 4,854,341 | A | * | 8/1989 | Bauer | ................ F04B 39/1053 137/516.21 |
| 4,924,906 | A | * | 5/1990 | Hrabal | ................ F04B 39/1033 137/512.1 |
| 5,052,434 | A | * | 10/1991 | Bauer | ................ F04B 39/1033 137/512.1 |

(Continued)

FOREIGN PATENT DOCUMENTS

| CH | EP 2249036 A1 * 11/2010 ......... F04B 39/1033 |
| DE | 202609 3/1907 |

(Continued)

*Primary Examiner* — Craig Schneider
*Assistant Examiner* — Frederick D Soski
(74) *Attorney, Agent, or Firm* — Dykema Gossett PLLC

(57) ABSTRACT

A valve plate (1) made of fiber-reinforced plastic for gas exchange valves for reciprocating piston compressors comprises at least two concentric sealing rings (3) which cooperate with corresponding sealing surfaces (4) at the valve seal (5) by way of profiled sealing surface (2) and that are connected by way of radial webs (6). In order to improve the flexibility of the valve plate (1) and the sealing behavior, the webs (6) are designed thinner along the entire radial extent thereof between the sealing rings (3) on both sides of the valve plate (1) compared to the adjacent thickness of the sealing rings (3).

9 Claims, 3 Drawing Sheets

(56) References Cited

U.S. PATENT DOCUMENTS

| | | | | |
|---|---|---|---|---|
| 5,483,992 | A * | 1/1996 | Lehmann | F04B 39/1033 137/516.21 |
| 6,149,400 | A * | 11/2000 | Samland | F04B 39/08 137/516.13 |
| 6,510,868 | B2 * | 1/2003 | Penza | F04B 39/1033 137/516.13 |
| 2004/0007824 | A1 * | 1/2004 | Durham | F04B 39/1033 277/456 |

FOREIGN PATENT DOCUMENTS

| | | | |
|---|---|---|---|
| DE | 692442 | 5/1940 | |
| WO | WO 0151811 A1 * | 7/2001 | F04B 39/1033 |

* cited by examiner

VALVE PLATE FOR GAS EXCHANGE VALVES

BACKGROUND OF THE INVENTION

Field of the Invention

The invention relates to a valve plate made of fiber-reinforced plastic for gas exchange valves of reciprocating piston compressors which includes at least two concentric seal rings that cooperate with corresponding seating surfaces at the valve seat by way of profiled sealing surfaces and are connected through radial webs, wherein between the seal rings the webs are designed to be thinner over the entire radial extent thereof in comparison to the adjacent thickness of the seal rings and on both sides of the valve plate.

The Prior Art

Inlet and outlet valves for reciprocating piston compressors with high stroke volumes are currently usually plate valves with a large number of concentrically arranged flow openings that are either covered by a one-piece steel or plastic valve plate or cooperate with individually profiled rings. Although as a consequence of the necessarily mutual movement of all areas of the plate the one-piece valve plates enable a relatively even load on the sealing and stopping surfaces, which are put under considerable stress during opening and closing, they also have the disadvantage with regard to flow redirection and associated flow losses as a result of the cooperating sealing surfaces, which must be achieved. On the other hand, valves with individual seal rings can be designed relatively easily with sealing surfaces that are oblique in the flow direction (as so-called profiled rings), which results in less flow redirection and thereby less flow losses.

In order to achieve maximum efficiency at minimal strokes, such plate valves must be as delicately designed as possible and thereby with as many seal rings as possible in the case of individual rings. However, the probability of unpredictable and chaotic valve motions increases with the number of rings. This problem increases in highly lubricated compressors due to oil adhesion at the valve seat.

Profiled plate valves with valve plates of the type mentioned above represent a type of hybrid with the advantages of one-piece, un-profiled valve plates (common motion), and the advantages of individually profiled sealing rings (efficiency, robustness). However, this concept also has a serious disadvantage. Based on unavoidable minimal dimensional deviations during manufacture and different thermal expansion behavior, in seal rings with oblique seating surfaces there is necessarily always small gaps that do not close until the closing pressure is applied and the ring deforms. This sealing behavior depends primarily on the inversion/eversion stiffness of the ring, and also on the magnitude of the deviation of the cooperating sealing surfaces. However, in profiled valve plates of the type mentioned the connecting radial webs prevent individual deformation of the individual rings, wherein the adjacent rings, with individual deviations thereof, can have even more of an effect. Profiled, one-piece valve plates made of plastic are used only seldom for this reason, and only for special applications.

WO 0151811 A1 dated Jul. 19, 2001 discloses a valve plate for gas exchange valves that can be manufactured from fiber-reinforced plastic, comprising two concentric sealing rings that cooperate with corresponding seating surfaces at the valve seat by way of profiled sealing surfaces and that are connected by way of radial webs, wherein the webs can be designed to be thinned between the sealing rings on both sides of the valve plate in comparison to the thickness of the adjacent sealing rings.

DE 202609 C dated Mar. 17, 1907 discloses a valve plate with two concentric sealing rings connected together by way of radial webs.

DE 692442 C, dated Jun. 19, 1940 discloses a plate valve comprising a valve plate that has concentric sealing rings, wherein cylindrical wound springs sit against the flat back side of the valve plate.

EP 0572748 A1 discloses a ring valve with a valve plate that comprises concentric sealing rings, wherein centering and if necessary holding knobs or depressions are provided at the back side of the valve plate for the valve springs.

The object of the present invention is to improve upon valve plates of the type mentioned above such that the sealing behavior at least approximates that of concentric individual rings using simple means, the advantages of one-piece valve plates still being retained with regard to the common movement of all sealing rings nevertheless.

SUMMARY OF THE INVENTION

This object is achieved for a valve plate of the type mentioned above in that at least some of the areas of reduced web thickness on the back side of the valve plate facing away from the sealing surfaces are designed to hold the valve springs and preferably also to center the same. The webs, as relatively rigid connections between the individual sealing rings are highly stressed. In addition to forces from the lifting off of the valve plate from the valve seat, high dynamic forces must be transferred during operation to maintain the common movement of the valve plate. Especially in the case of uneven oil adhesion at the cooperating profiled sealing surfaces, relatively high break-away forces must be transmitted which must be transferred from one ring to the ring adjacent thereto as shear and bending forces by way of the radial webs. A large thickness of the webs would be advantageous here if at all possible. It has been surprisingly shown that a large webs thickness, which negatively affects the sealing, is not at all necessary. Rather, to the contrary, one can make do even with a thinning of the webs compared to the adjacent sealing rings, whereby targeted flexibilization is achieved in a very advantageous way, which improves the sealing behavior dramatically even though there is sufficient remaining stiffness of the entire valve plate. By providing for the holding and if necessary centering of the valve springs, the areas of thinning can at the same time also carry out a second function, which simplifies the design of the entire valve. The design of notches to hold valve springs in the area of the connection webs of the concentric sealing rings of a plastic valve plate is therefore known, for example from EP 572748B1, but in this case the individual sealing rings themselves are not profiled. Rather, they are designed with flat sealing surfaces and cooperate with flat sealing surfaces at the valve seat. Furthermore, the notch for holding the valve springs is cut out only in the middle area of the web, which is otherwise of the same thickness as the sealing rings, which leads to high load peaks around the notch and the risk of web breakage in this area due to the local weakening of the web cross section as a result. On the other hand, according to the present invention, the entire area of reduced thickness of the web has been designed to hold the respective valve spring, which does not hinder the flexibility of the web and shifts higher loads to the adjacent thicker sealing ring.

In another embodiment of the invention, at least some of the areas of reduced thickness of the webs on the back side of the valve plate can be expanded at least on one side into the adjacent sealing rings, which provides another way to improve the flexibility in this area without any negative effects with regard to loads occurring there.

In another embodiment of the invention, the areas of reduced thickness of the webs on the back side of the valve plate can also be continuous over the entire radial extent of the sealing plate in this area, which further improves the flexibility of the entire valve plate.

In another advantageous embodiment of the invention, the thickness of the webs are 40 to 70%, preferably 50 to 60%, of the thickness of the sealing rings, wherein the thickness of the webs is preferred to be reduced at least approximately symmetrically on both sides of the valve plate, deviating by preferably no more than 10% from symmetric, compared to the sealing rings. These embodiments have proven to be an optimum compromise between improvement of flexibility and maintenance of a stiffness required for common movement of the concentric sealing rings.

According to another embodiment of the invention, in the area where the valve spring is held, raised areas can be provided for internal centering of the valve springs, as are known per se from EP 572748B1, for example, which has also already been cited. These raised areas can be used for centering in addition to the designs of the areas of reduced thickness of the webs.

BRIEF DESCRIPTION OF THE DRAWINGS

The invention is explained below in more detail with the aid of the exemplary embodiments partially shown schematically in the drawings, wherein.

DETAILED DESCRIPTION OF THE DEPICTED EMBODIMENTS

Figure 1:
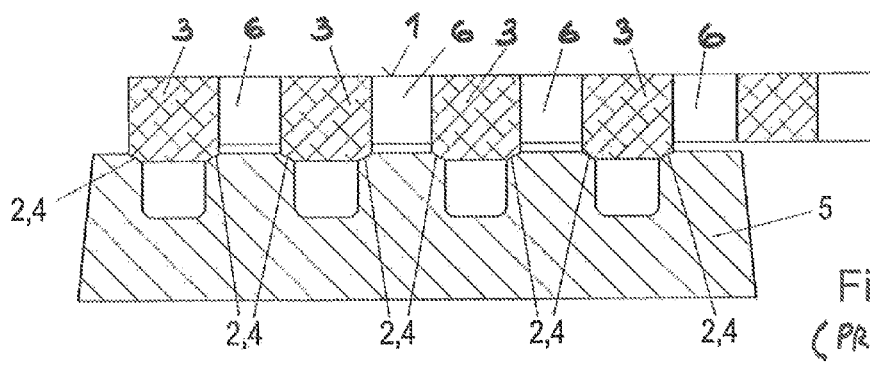
FIG. 1 shows a partial section through a geometrically optimum sealing valve plate (theoretical assumption) at the associated valve seat.

According to FIG. 1, for the theoretically assumed valve plate 1 according to the prior art all profiled sealing surfaces 2 on the four concentric sealing rings 3 shown are in optimum geometrically sealing cooperation with the correspondingly profiled seating surfaces 4 at the valve seat 5, which leads to optimum valve seal, without the valve plate 1, which is made of fiber-reinforced plastic, or the concentric sealing rings 3 thereof moving in any way relative to the valve seat 5 or seating surfaces 4, which are usually made of metal, or having to be matched to the seat or seating surfaces.

Figure 2:
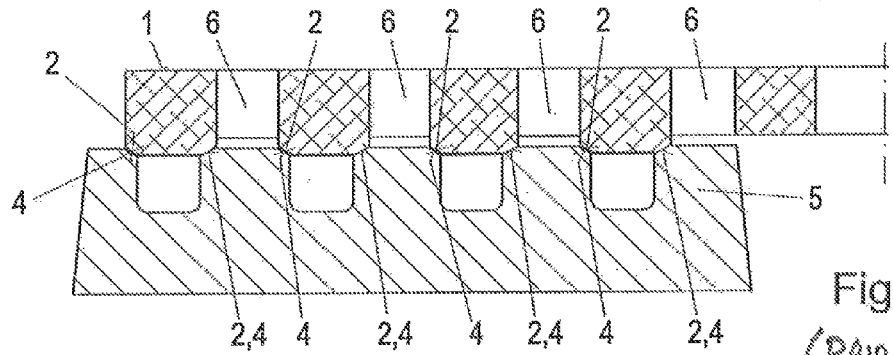
FIGS. 2 and 3 show corresponding sections through normally real, existing valve plates in different load states.
Figure 3:
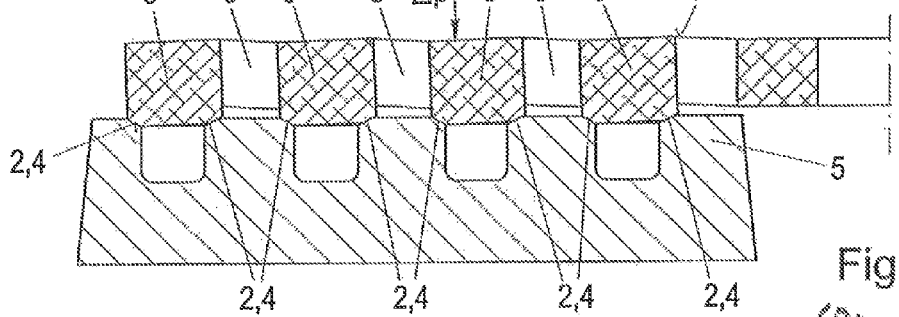

It is evident that this theoretical assumption in actuality cannot be attained—in reality a valve plate looks like that depicted in FIGS. 2 and 3 according to known designs up till now. The individual sealing surfaces 2 of the sealing rings 3 only cooperate in a direct sealing manner randomly and in areas with the associated seating surfaces 4 at the valve seat 5 provided that no separate forces are acting on the individually cooperating elements as seen according to the representation in FIG. 2. Such separate forces arise according to FIG. 3 due to the differential pressure Δp that arises upon closing, which causes the individual sealing rings 3 to invert/evert in areas, which inversion/eversion is working against their own stiffness and the stiffness of the connection webs 6 therebetween.

After the relatively rigid radial webs 6 for connecting the individual concentric sealing rings 3 substantially interferes with the inversion/eversion stiffness of the individual sealing rings 3, the sealing behavior of the individual sealing rings 3 is negatively affected and in some circumstances even entirely prevented. This leads to functional impairments of the valves and to increased wear of the sealing surfaces 2.

Figure 4:
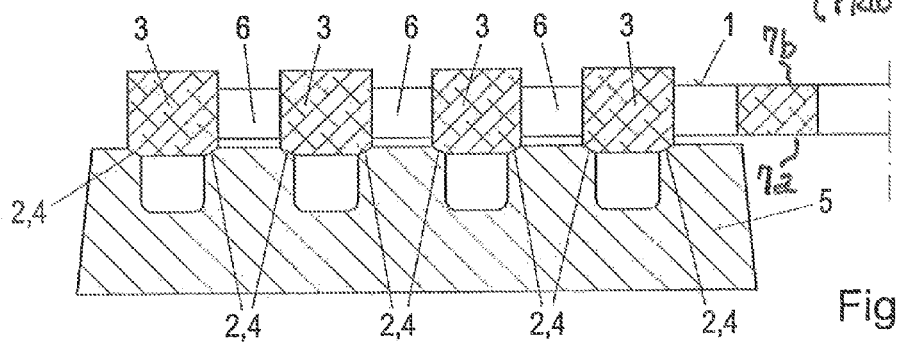
FIG. 4 shows a valve plate according to the present invention in the closed, sealed state.

In the design according to FIG. 4, according to the invention the webs 6 between the sealing rings 3 are designed over the entire radial extent thereof to be thinner than the adjacent thickness of the sealing rings 3 and on both sides of the valve plate 1, wherein the thickness of the webs here is about 60% of the thickness of the sealing rings 3 and the reduction on both the front and back sides 7a, 7b of the valve plate 1 is at least approximately symmetrical. This results in a thermo symmetric design, wherein the degree of reduction of cross sectional area seeks an optimum compromise between achieving adaptability and maintaining stiffness of the valve plate 1.

Figure 5:
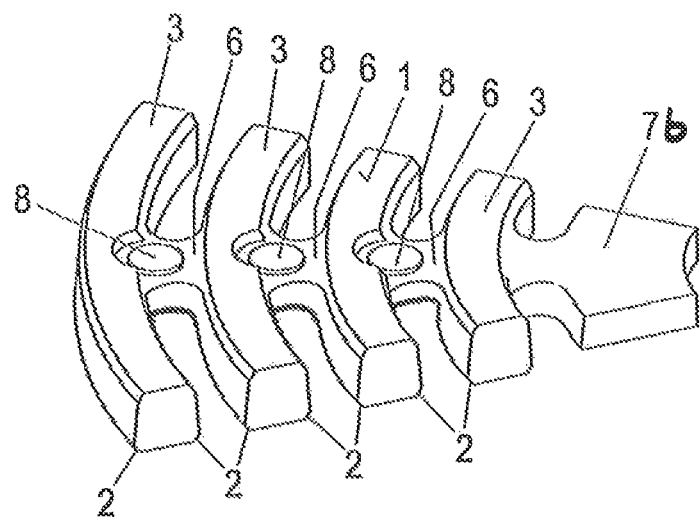
FIGS. 5 through 8 show perspective excerpts of other embodiments according to the present invention.
Figure 6:
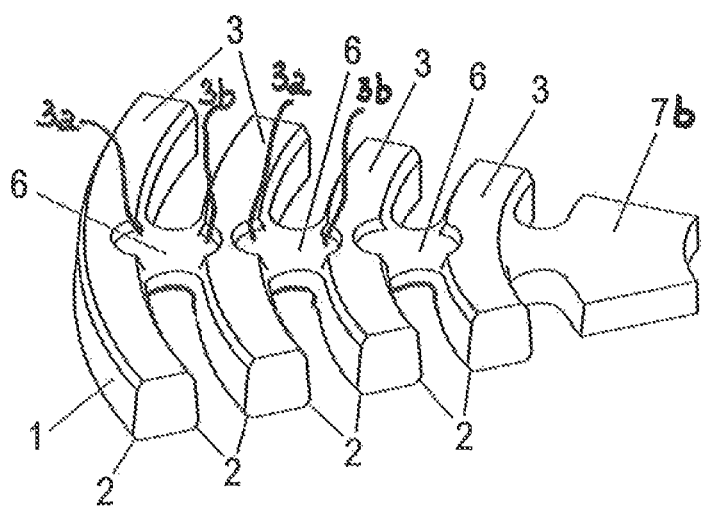
Figure 8:
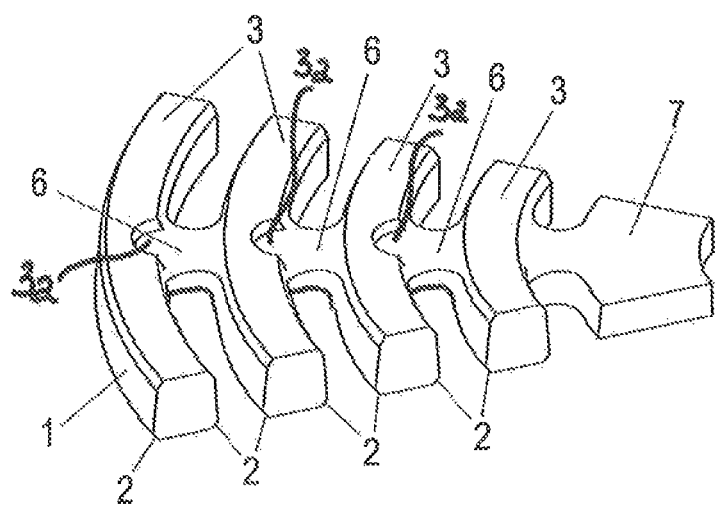

In the valve plate 1 according to FIGS. 5, 6 and 8, at least some of the areas of reduced thickness of the webs 6 are designed on the back side 7b of the valve plate 1 facing away from the sealing surfaces 2 for holding and preferably also centering valve springs, which are not shown further here, the springs being thereby held relative to the valve plate 1. In the design according to FIGS. 5 and 8, to do so, the areas of reduced thickness of the webs 6 are each expanded into the adjacent sealing rings 3 on the back side 7b of the valve plate 1 as recesses 3a on one side. In the design according to FIG. 6, each expansion is done on both sides into the sealing rings 3 as recesses 3a, 3b.

In the design according to FIG. 5, a disc-shaped raised area 8 for internal centering of each valve spring, which is not shown, is provided in the area where the valve spring is held. This improves the fixing of the ends of the spring.

Figure 7:
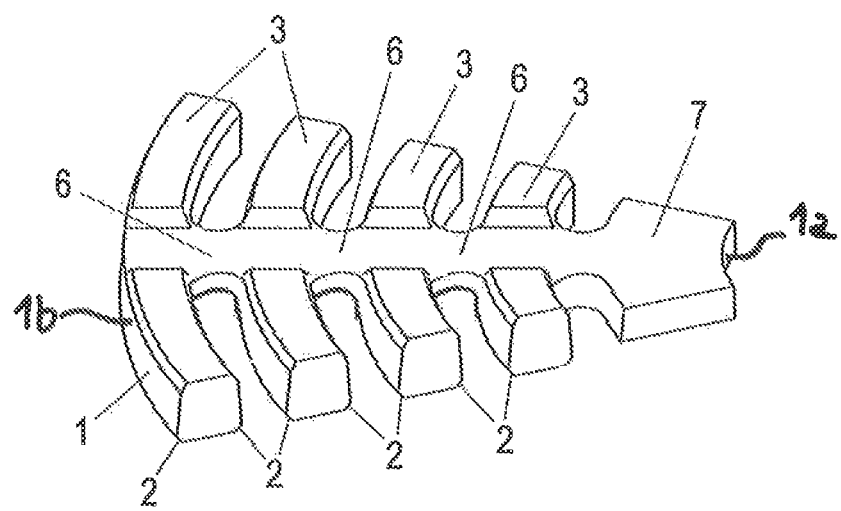

In the design according to FIG. 7, the areas of reduced thickness of the webs 6 on the back side 7b of the valve plate 1 are designed continuous over the entire radial extent of the valve plate 1 in this area from the inner circumferential surface 1a of the plate to the outer circumferential surface 1b, which offers an expanded way to improve the flexibility of the valve plate.

The invention claimed is:

1. A valve plate for use in a gas exchange valve of a reciprocating compressor, said valve plate having a front side and a back side and comprising:
    first and second radially-spaced concentric sealing rings which each defines a front face and a back face and a first thickness therebetween, each said front face providing circumferential sealing surfaces, and
    a radially-extending web which extends between said first and second concentric sealing rings, said web having a second thickness which is less than said first thickness and defines front and back faces which are recessed relative to the front and back faces of said first and second sealing rings, said back face of said web extending into said first sealing ring to form a recess in the back face of the first sealing ring.

2. The valve plate according to claim 1, wherein said recess is concave.

3. The valve plate according to claim 1, including a raised area on the back face of said web.

4. The valve plate according to claim 3, wherein said raised area is cylindrical.

5. The valve plate according to claim 1, wherein said back face of said web extends into said second sealing ring to form a recess in the back face of the second sealing ring.

6. The valve plate according to claim 5, wherein said recess is concave.

7. The valve plate according to claim 5, including a raised area on the back face of said web.

8. The valve plate according to claim 7, wherein said raised area is cylindrical.

9. A valve plate for use in a gas exchange valve of a reciprocating compressor, said valve plate having a front side, a back side, a radially inner circumferential surface, and a radially outer circumferential surface, and comprising:
- a plurality of radially-spaced concentric sealing rings which each has a front face and a back face and defines a first thickness therebetween, each said front face providing circumferential sealing surfaces, and
- a radially-extending web which extends between said concentric sealing rings, said web having a second thickness which is less than said first thickness and defines front and back faces which are recessed relative the front and back faces of each of said plurality of concentric sealing rings,
- said back face of said radially-extending web extending from said inner circumferential surface of said plate to said outer circumferential surface and through said sealing rings.

\* \* \* \* \*